US011881114B2

(12) United States Patent
Artic

(10) Patent No.: US 11,881,114 B2
(45) Date of Patent: Jan. 23, 2024

(54) METHOD AND SYSTEM FOR VISUALIZING AIRCRAFT COMMUNICATIONS

(71) Applicant: The Boeing Company, Chicago, IL (US)

(72) Inventor: Daniel Artic, Biebesheim (DE)

(73) Assignee: The Boeing Company, Arlington, VA (US)

(*) Notice: Subject to any disclaimer, the term of this patent is extended or adjusted under 35 U.S.C. 154(b) by 24 days.

(21) Appl. No.: 17/586,199

(22) Filed: Jan. 27, 2022

(65) Prior Publication Data

US 2023/0237916 A1 Jul. 27, 2023

(51) Int. Cl.
*G08G 5/00* (2006.01)

(52) U.S. Cl.
CPC ........... *G08G 5/0021* (2013.01); *G08G 5/006* (2013.01); *G08G 5/0013* (2013.01)

(58) Field of Classification Search
CPC ..... G08G 5/0013; G08G 5/0021; G08G 5/006
See application file for complete search history.

(56) References Cited

U.S. PATENT DOCUMENTS 8,200,378 B1 * 6/2012 Chiew .................. G08G 5/0086 701/16
8,996,202 B1 * 3/2015 Dorfmann ............ G01C 23/005 701/3
10,290,216 B1 * 5/2019 McCusker ........... G01C 21/387
2008/0109160 A1 * 5/2008 Sacle ................... G08G 5/0013 701/33.4
2013/0027226 A1 * 1/2013 Cabos .................. G08G 5/0082 340/961
2014/0062729 A1 * 3/2014 Conner .............. B64D 45/0015 340/972
2016/0209234 A1 * 7/2016 Passinger ............... B64D 43/00
2016/0217693 A1 * 7/2016 Samuthirapandian ....................... G08G 5/0039
2017/0310749 A1 * 10/2017 Vasek ................. H04L 65/1069
2018/0182250 A1 * 6/2018 Bonnet ................ G08G 5/0013
2020/0168104 A1 * 5/2020 Holder ................. G08G 5/0039
2022/0343897 A1 * 10/2022 Agarwal ............... G10L 15/063
2023/0038694 A1 * 2/2023 Foo ........................ G08G 5/045

* cited by examiner

*Primary Examiner* — Andrew W Bee
(74) *Attorney, Agent, or Firm* — McDonnell Boehnen Hulbert & Berghoff LLP

(57) ABSTRACT

A computer-implemented method for communicating information to an electronic flight bag device (EFB) comprises receiving one or more notification to airmen messages (NOTAMs) that specify conditions associated with one or more runways or taxiways of an airport. The computing system selects from among the received NOTAMs one or more NOTAMs that specify particular conditions under which corresponding runways or taxiways are or will be closed to aircraft traffic. For each selected NOTAM, the computing system generates overlay data that specifies a graphical representation indicative of the particular conditions under which the corresponding runway or taxiway is or will be closed. The computing system communicates the overlay data associated with the selected NOTAMs to the EFB. The graphical representations specified by the overlay data are configured to be overlayed on a map that depicts runways and taxiways and that is configured to be presented by the EFB.

21 Claims, 8 Drawing Sheets

NOTAM RECORDS
135

| ID | NOTAM DESCRIPTION | GEOGRAPHIC DATA |
|---|---|---|
| 1 | RWY 03/04 CLSD | $GD_1$ |
| 2 | RWY 07/08 CLSD EXC TX | $GD_2$ |
| 5 | RWY 05/06 FST 1000FT CLSD EXC TAX | $GD_3$ |
| ... | ... | ... |
| N | RWY 07/08 CLSD TO ACFT WINGSPAN MORE THAN 70FT AND TAIL HGT MORE THAN 49FT | $GD_M$ |

*Fig. 3*

METHOD AND SYSTEM FOR VISUALIZING AIRCRAFT COMMUNICATIONS

BACKGROUND

Field

This application generally relates to aircraft communications. In particular, this application describes examples of methods and systems for visualizing aircraft communications.

Description of Related Art

Timely information related to airport conditions is an important consideration to aircraft flight crew preparing to takeoff from or land at a particular airport. For instance, the flight crew may wish to know which taxiways and/or runways are available for taxiing to facilitate estimating a takeoff time. The flight crew's knowledge of any limitations associated with the use of a runway, such as aircraft wingspan or weight limitations factors into a flight crew's decisions. Additionally, knowing transient conditions of a runway, such as whether the runway is wet, covered with snow, etc., factors into the flight crew's decisions.

Aviation authorities such as the Federal Aviation Authority (FAA), Eurocontrol, etc., typically publish Notice to Airmen/Air Missions notices (NOTAMs) that convey this information. A typical NOTAM is a brief textual description of the status or condition of a runway or taxiway at an airport. The description is usually presented in all uppercase letters with various abbreviated terms to minimize the length of the description. Flight crews are ordinarily expected to review NOTAMs prior to taking off from or landing at an airport.

SUMMARY

In a first aspect, a computer-implemented method for communicating information to an electronic flight bag device (EFB) comprises receiving, by a computing system, one or more notification to airmen messages (NOTAMs) that specify conditions associated with one or more runways or taxiways of an airport. The computing system selects from among the received NOTAMs one or more NOTAMs that specify particular conditions under which corresponding runways or taxiways are or will be closed to aircraft traffic. For each selected NOTAM, the computing system generates overlay data that specifies a graphical representation indicative of the particular conditions under which the corresponding runway or taxiway is or will be closed. The computing system communicates the overlay data associated with the selected NOTAMs to the EFB. The graphical representations specified by the overlay data are configured to be overlayed on a map that depicts runways and taxiways and that is configured to be presented by the EFB.

In a second aspect, a computing system that facilitates communicating information to an electronic flight bag device (EFB) includes a memory and a processor and the memory stores instruction code. The processor is in communication with the memory. The instruction code is executable by the processor to cause the computing system to perform operations that comprise receiving one or more notification to airmen messages (NOTAMs) that specify conditions associated with one or more runways or taxiways of an airport. The computing system selects from among the received NOTAMs one or more NOTAMs that specify particular conditions under which corresponding runways or taxiways are or will be closed to aircraft traffic. For each selected NOTAM, the computing system generates overlay data that specifies a graphical representation indicative of the particular conditions under which the corresponding runway or taxiway is or will be closed. The computing system communicates the overlay data associated with the selected NOTAMs to the EFB. The graphical representations specified by the overlay data are configured to be overlayed on a map that depicts runways and taxiways and that is configured to be presented by the EFB.

In a third aspect, a non-transitory computer-readable medium having stored thereon instruction code that facilitates communicating information to an electronic flight bag device (EFB) is provided. When the instruction code is executed by a processor of a computing system, the computing system performs operations that comprise receiving one or more notification to airmen messages (NOTAMs) that specify conditions associated with one or more runways or taxiways of an airport. The computing system selects from among the received NOTAMs one or more NOTAMs that specify particular conditions under which corresponding runways or taxiways are or will be closed to aircraft traffic. For each selected NOTAM, the computing system generates overlay data that specifies a graphical representation indicative of the particular conditions under which the corresponding runway or taxiway is or will be closed. The computing system communicates the overlay data associated with the selected NOTAMs to the EFB. The graphical representations specified by the overlay data are configured to be overlayed on a map that depicts runways and taxiways and that is configured to be presented by the EFB.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 3 illustrates NOTAM records stored in a NOTAM database, in accordance with example embodiments.

DETAILED DESCRIPTION

Figure 1:
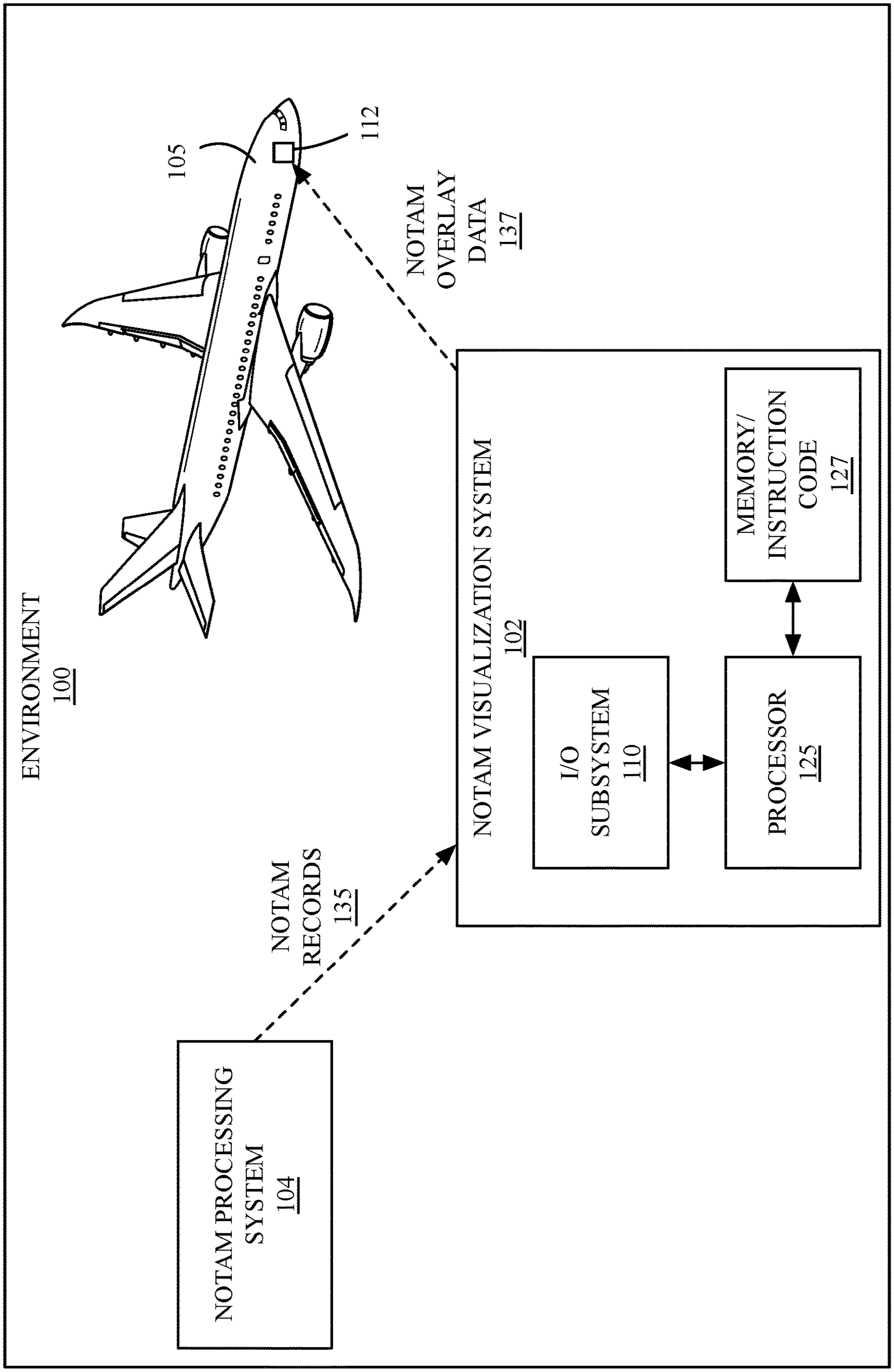
FIG. 1 illustrates an environment that includes various devices that facilitate the visualization of NOTAMs communicated to an electronic flight bag device (EFB), in accordance with example embodiments.

Various examples of systems, devices, and/or methods are described herein. Any embodiment, implementation, and/or feature described herein as being an example is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

As noted above, aviation regulatory authorities publish NOTAMs that convey the status or conditions of runways and/or taxiways at an airport. In some cases, the NOTAMs are communicated (e.g., via a wired or wireless network) to an electronic flight bag EFB, which is a device configured to help flight crews perform flight management tasks more easily and efficiently and with less paper. In this regard, some examples of the EFB correspond to personal computers, tablets, smartphones, wearable devices, etc., configured to display operating manuals, navigational charts, airport maps, etc. Some examples of the EFB are carried by the flight crew and/or are integrated within aircraft.

NOTAMs communicated to the EFB are usually presented in all uppercase letters, with various terms being abbreviated to minimize the length of the NOTAM. However, it can be difficult for the flight crew to discern relevant NOTAMs when they are presented in this manner. This issue is exacerbated for large airports having many runways and taxiways for which numerous NOTAMs may be issued.

These and other issues are ameliorated by the methods and systems described herein that facilitate the visualization of NOTAMs on an EFB. For instance, an example of a NOTAM visualization system described herein is configured to receive one or more NOTAMs that specify conditions associated with one or more runways or taxiways of an airport. The NOTAM visualization system is configured to select from among the received NOTAMs, one or more NOTAMs that specify particular conditions under which corresponding runways or taxiways are or will be closed to aircraft traffic. The NOTAM visualization system is configured to generate NOTAM overlay data for each selected NOTAM. The overlay data specifies a graphical representation indicative of the particular conditions under which the corresponding runway or taxiway is or will be closed. In some examples, the NOTAM visualization system is configured to communicate the overlay data associated with the selected NOTAMs to an EFB. In some examples, the graphical representations specified by the overlay data are configured to be overlayed on a map that depicts runways and taxiways and that is configured to be presented by the EFB.

In some examples, the particular condition referred to above corresponds to the closing of a section of a runway or a taxiway to aircraft, a restriction on the time or type of use of the runway or the taxiway (or a portion thereof), and/or aircraft attribute limitations associated with a runway or taxiway (or a portion thereof).

In some examples, the NOTAM visualization system generates a user-selectable indicator that, when selected, causes the text of the NOTAM to be presented by the EFB system.

As noted above, the NOTAMs are textual notifications. In some examples, the selecting performed above involves searching the NOTAMs for text terms indicative of runway closings and/or taxiway closings.

In some examples, the NOTAMs are received by a NOTAM processing system that is configured to store database records that associate the NOTAMs with geographic features of airports associated with the NOTAMs. The geographic features facilitate overlaying the graphical representations on the map that depicts runways and taxiways. In some examples, the NOTAM processing system generates these database records in real-time, and the NOTAM visualization system is configured to select relevant NOTAMs from among the database records in real-time. In some examples, the NOTAM visualization system is configured to select relevant NOTAMs on an ad-hoc basis (e.g., once a day).

In some examples, the NOTAM visualization system is configured to disregard NOTAMs that are irrelevant to a particular flight. For instance, in an example where the EFB is associated with a particular aircraft, NOTAMs that set limits on the type of aircraft that can use a particular runway or taxiway (e.g., weight limits, size limits, etc.) are not selected for graphical representation when the corresponding aircraft falls within the limits. In another example, graphical representations of NOTAMs that specify conditions or exceptions associated with landings at a particular runway are not communicated to aircraft preparing to takeoff. In another example, graphical representations of NOTAMs that specify conditions or exceptions associated with takeoffs at a particular runway are not communicated to aircraft preparing to land.

FIG. 1 illustrates an example of an environment 100 that includes a NOTAM visualization system 102, a NOTAM processing system 104, an EFB 112, and an aircraft 105.

Some examples of the NOTAM visualization system 102 comprise a memory 127, a processor 125, and an input/output (I/O) subsystem 110. The processor 125 is in communication with the memory 127. The processor 125 is configured to execute instruction code stored in the memory 127. The instruction code facilitates performing, by the NOTAM visualization system 102, various operations that are described below. In this regard, the instruction code may cause the processor 125 to control and coordinate various activities performed by the different subsystems of the NOTAM visualization system 102. Some examples of the processor 125 can correspond to a stand-alone computer system such as an ARM®, Intel®, AMD®, or PowerPC® based computer system or a different computer system and can include application-specific computer systems. The computer system can include an operating system, such as Android™, Windows®, Linux®, Unix®, or a different operating system.

Some examples of the I/O subsystem 110 include one or more input/output interfaces configured to facilitate communications with entities outside of the NOTAM visualization system 102. An example of the I/O subsystem 110 includes wired or wireless communication circuitry configured to facilitate communicating information, such as, for example, receiving NOTAMs 135 from the NOTAM processing system 104 and communicating the overlay data 137 to the EFB 112. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology or a different wireless network.

Figure 2:
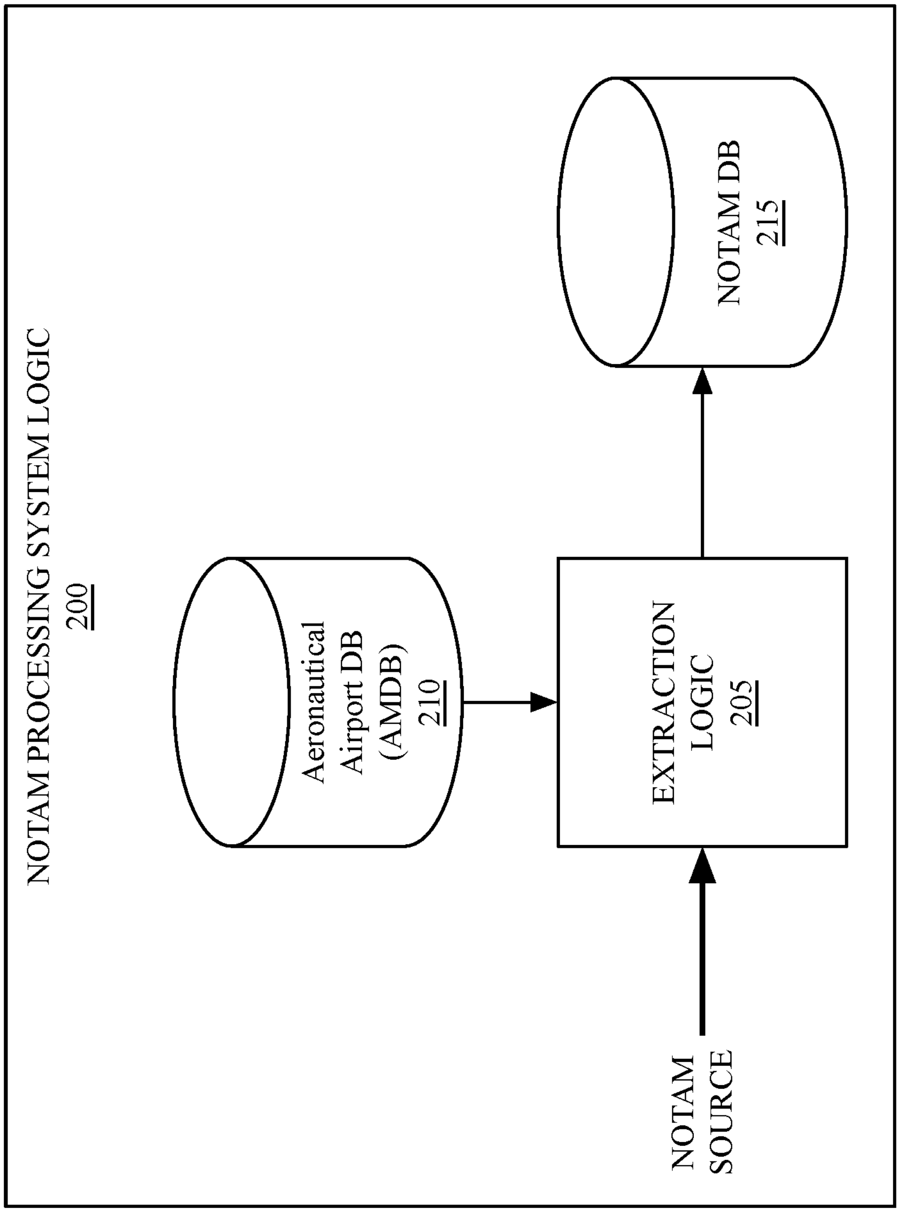
FIG. 2 illustrates NOTAM processing logic implemented by a NOTAM processing system, in accordance with example embodiments.

FIG. 2 illustrates an example of NOTAM processing logic 200 implemented by some examples of the NOTAM processing system 104. The NOTAM processing logic 200 includes extraction logic 205 that is configured to receive airport geographic information from an aeronautical airport DB (AMDB) 210 and NOTAMs issued by a NOTAM source (e.g., an aviation regulatory authority such as the Federal Aviation Authority (FAA), Eurocontrol, etc.)

Examples of the NOTAM correspond to text notices that alert flight crew of potential hazards along a flight route or at a location that could affect the safety of the flight. Examples of the NOTAMs are presented in all uppercase letters with various abbreviated terms to minimize the length of the NOTAM. Examples of the NOTAMs contain information concerning the conditions/exceptions associated with one or more runways and taxiways of airports.

An example of the AMDB 210 corresponds to a Jeppesen Airport Mapping Database. An example of the AMDB 210 specifies geographic aspects of a plurality of airports. Examples of geographic aspects represented in the AMDB 210 include runways, taxiways, gates, etc. In some examples, the geographic aspects are specified in terms of points, lines, and polygons that can be overlayed on, for example, an aerial image (e.g., a satellite image) of an airport and used to more particularly define important geographic aspects of the airport (e.g., precise locations and dimensions of runways, taxiways, gates, etc.). Some examples of the AMDB 210 store additional airport aspects, such as surface type, name/object identifier for the features, runway slope, etc.

Some examples of the extraction logic 205 are configured to output records 135 that associate information specified in the NOTAMs received from the NOTAM source to particular runways, taxiways, etc., specified in the AMDB 210.

Some examples of the extraction logic 205 are configured to determine when a particular NOTAM will come into effect. In this regard, some examples of the extraction logic 205 output records to a NOTAM database 215 that relate NOTAMS to airport features (e.g., runways, taxiways, etc.) according to the schedules. For instance, in an example, the record is not stored in the NOTAM database 215 until a scheduled time at which the NOTAM will come into effect.

FIG. 3 illustrates NOTAM records 135 stored in an example of a NOTAM database 215. Some examples of the NOTAM records 135 include an ID field, a NOTAM description field, and a geographic data field. An example of the ID field specifies information (e.g., a randomly assigned value) that uniquely identifies a particular NOTAM record. An example of the NOTAM description field specifies the text of a particular NOTAM. An example of the geographic data field specifies the geographic data associated with a corresponding NOTAM. An example of the geographic data field specifies points, lines, and polygons that can be overlayed on, for example, an aerial image (e.g., a satellite image) of an airport and used to define important geographic aspects of the airport more particularly (e.g., precise locations and dimensions of runways, taxiways, gates, etc.).

Figure 4:
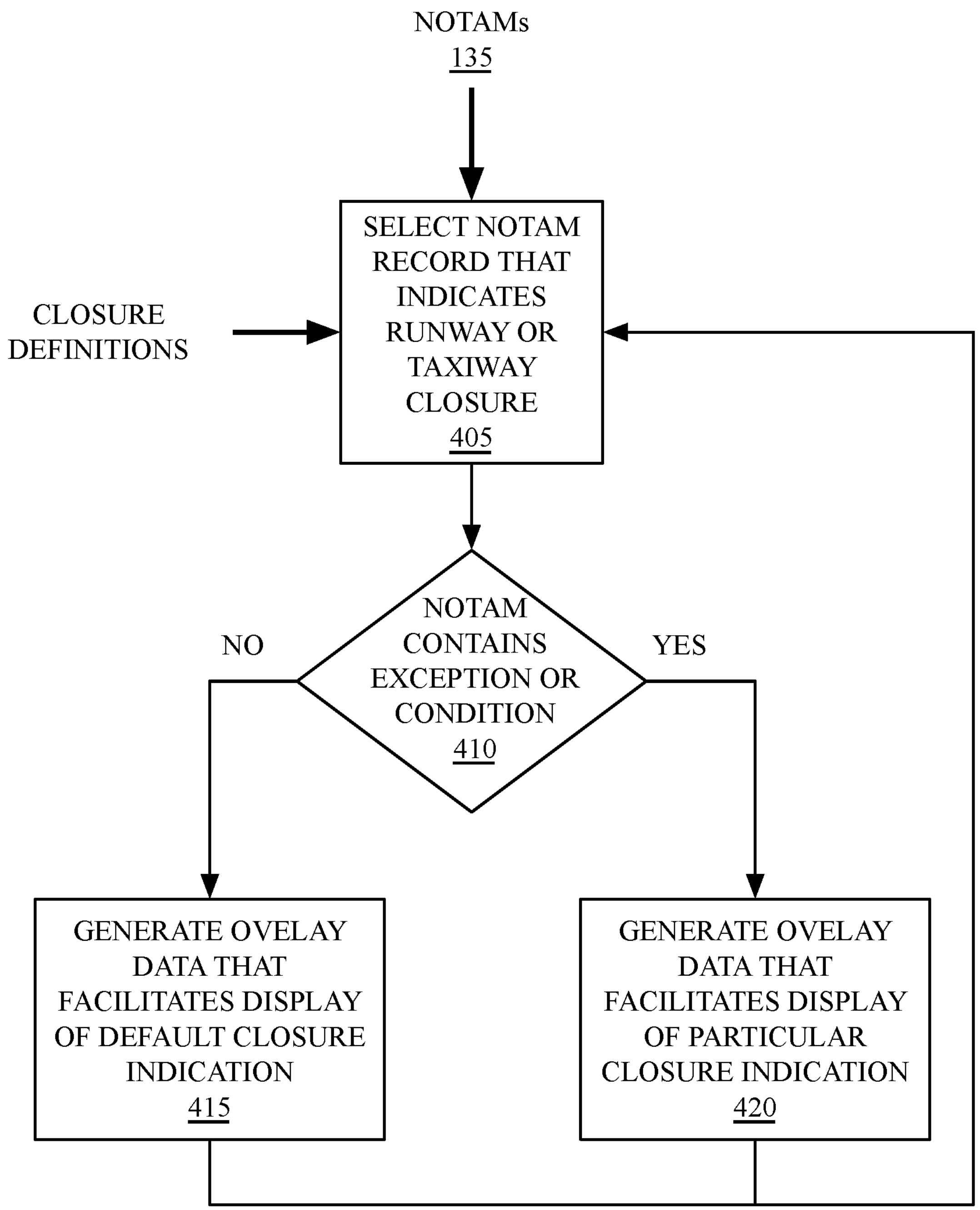
FIG. 4 illustrates operations performed by a NOTAM visualization system, in accordance with example embodiments.

FIG. 4 illustrates examples of operations performed by the NOTAM visualization system 102. The operations at block 405 involve selecting NOTAMS records 135 that indicate runway or taxiway closures. In this regard, some examples of the NOTAM visualization system 102 query the NOTAM database 215 of the NOTAM processing system 104 for NOTAM records 135 related to the closing of a runway or taxiway. Some examples of the NOTAM visualization system 102 query for particular terms that are predetermined to be associated with the closing of a runway or taxiway. Some examples of these terms are "CLOSED," "NOT AVAILABLE," "FORBIDDEN," "NOT PERMITTED," "DECOMMISSIONED," "COMPLETELY WITHDRAWN," "CLSD," "CLD," etc.

The operations at block 410 involve determining whether a particular NOTAM record 135 identified at block 405 specifies an exception or condition to the closing of the runway or the taxiway. For example, referring to the NOTAMS records 135 FIG. 3, the first record specifies "RWY 03/04 CLSD," which indicates that runway 03/04 is unconditionally closed. The second record specifies "RWY 07/08 CLSD EXC TX," which indicates that runway 07/08 is closed for all activities with the exception of taxiing. In this regard, some examples of the NOTAM visualization system 102 query for particular terms that are predetermined to be associated with exceptions. Some examples of these terms are "EXC," "EXCEPTION," etc.

If, at block 410, the NOTAM is not associated with a condition or exception, then the operations at block 415 are performed. The operations of block 415 involve generating NOTAM overlay data 137 that facilitates the representation of a default closure indication on an airport map. An example of a graphical representation that indicates the default closure of a runway is shown in FIG. 5B.

If, at block 410, the NOTAM is associated with a condition or exception, then the operations at block 420 are performed. The operations of block 420 involve generating NOTAM overlay data 137 that facilitates the representation of a closure indication that indicates the condition or exception on an airport map. Examples of graphical representations that indicate conditional/exceptional closure of a runway are shown in FIGS. 5C and 5D.

In some examples, the NOTAM overlay data 137 generated above is communicated to the EFB 112, and the EFB 112 depicts the graphical representation of the corresponding NOTAM over a map of an airport.

Figure 5A:
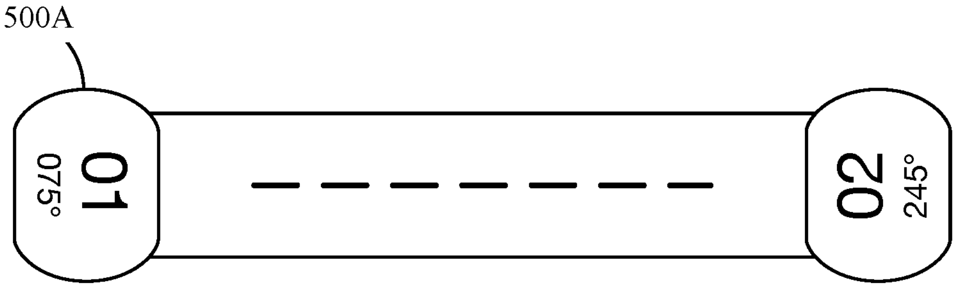
FIG. 5A illustrates a NOTAM graphical representation associated with a NOTAM that does not specify the closure of a runway, in accordance with example embodiments.
Figure 5B:
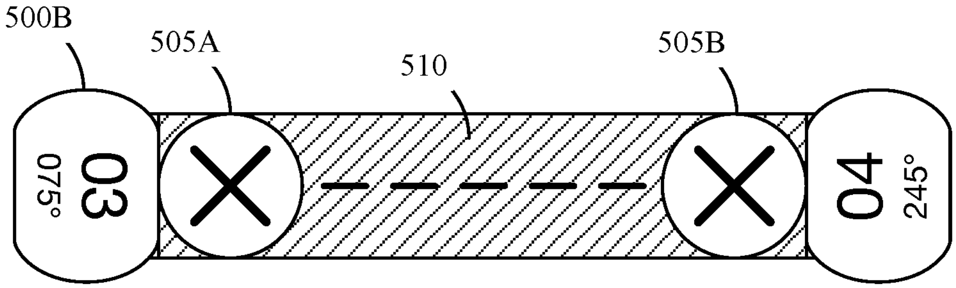
FIG. 5B illustrates a NOTAM graphical representation associated with a NOTAM that specifies the unconditional closure of a runway, in accordance with example embodiments.
Figure 5C:
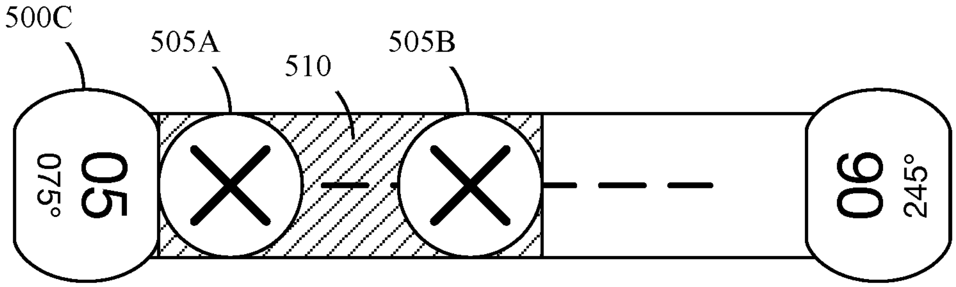
FIG. 5C illustrates a NOTAM graphical representation associated with a NOTAM that specifies a conditional closure of a runway, in accordance with example embodiments.
Figure 5D:
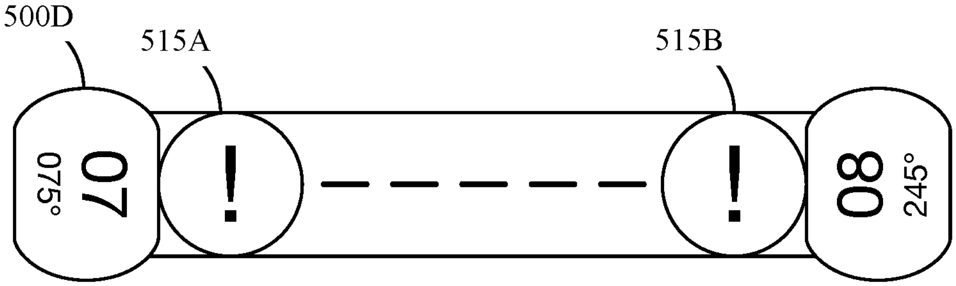
FIG. 5D illustrates a NOTAM graphical representation associated with a NOTAM that specifies an exception for the use of a runway, in accordance with example embodiments.

FIGS. 5A-5D illustrate examples of NOTAM graphical representations 500 associated with various NOTAMs. FIG. 5A illustrates an example of a NOTAM graphical representation 500A associated with a NOTAM that does not specify the closure of a runway.

FIG. 5B illustrates an example of a NOTAM graphical representation 500B associated with a NOTAM that specifies the unconditional closure of a runway. The NOTAM graphical representation 500B includes a pair of indicators 505A, 505B (e.g., "Xs") on either end of the runway and a hash overlay 510 between the indicators 505A, 505B to indicate the unconditional closure of the entire runway. In an example, the NOTAM graphical representation 500B is used to represent a NOTAM such as "RWY 03/04 CLSD," which indicates the unconditional closure of runway 03/04.

FIG. 5C illustrates an example of a NOTAM graphical representation 500C associated with a NOTAM that specifies a conditional closure of a runway. The NOTAM graphical representation 500C includes a pair of indicators 505A, 505B (e.g., "X") and a hash overlay 510 between the indicators 505A, 505B that indicates a section of the runway that is closed. In an example, the NOTAM graphical representation 500C is used to represent a NOTAM such as "RWY 05/06 FST 1000 FT CLSD EXC TAX." The terms "FST 1000 FT" indicate that the first 1000 feet of the runway are closed to takeoffs and landings. The terms "EXC TAX" indicate that the closed section can be used for taxiing. In an example, the relative position of the indicators 505A, 505B indicates the section of the runway to be closed. For example, if the runway is 10000 feet long and the first 2000 feet of the runway is closed, the indicators 505A, 505B are positioned to indicate that the first 20% of the runway is closed.

FIG. 5D illustrates an example of a NOTAM graphical representation 500D associated with a NOTAM that specifies an exception for the use of a runway. The NOTAM graphical representation 500D includes a pair of indicators 515A, 515B (e.g., "!"). In an example, this NOTAM graphical representation 500D is used to represent a NOTAM such as "RWY 07/08 CLSD TO ACFT WINGSPAN MORE THAN 70 FT AND TAIL HGT MORE THAN 49 FT." This NOTAM indicates that the runway is restricted to aircraft having a wingspan no more than 70 ft and tail height no more than 49 ft. In another example, this NOTAM graphical representation is used to represent a NOTAM that specifies a scheduled closure, such as an indication that a particular runway will be closed during a particular period (e.g., closed for one month for repairs, closed for certain hours or days during the week, etc.).

In FIG. 5D, the indicators 515A, 515B are placed at the extremes of the runway and indicate that the corresponding exception applied to the entire runway. In another example, the indicators 515A, 515B are placed to cover a section of the runway (e.g., as in FIG. 5C) to indicate that the corresponding exception applies to the corresponding section of the runway.

In an example, a member of the flight crew can select one of the indicators 515A, 515B to determine information associated with the exception. In this regard, in some examples, the overlay data 137 associated with a particular graphical representation 500 also specifies the corresponding NOTAM associated with the graphical representation 500.

Figure 6:
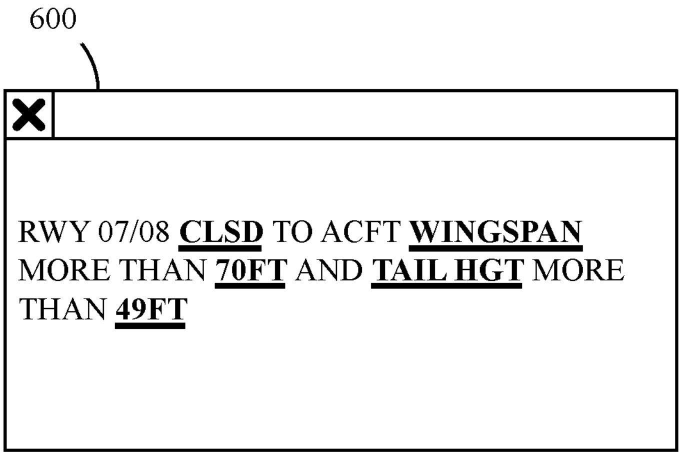
FIG. 6 illustrates a dialog box that is displayed in response to user selection of an indicator of a NOTAM graphical representation, in accordance with example embodiments

FIG. 6 illustrates an example of a dialog box 600 that is displayed (e.g., by the EFB 112) in response to user selection of an indicator 515 of a NOTAM graphical representation 500. The dialog box 600 in this example is presented in response to the selection of one of the exception indicators 515A, 515B of FIG. 5D. In an example, the text of the corresponding NOTAM description is presented within the dialog box 600. In some examples, key terms of the NOTAM description are emphasized (e.g., presented in bold type, underlined, larger font, etc.) to highlight critical aspects of the NOTAM description. For instance, in this example, the terms "CLSD," "WINGSPAN," "70 FT," "TAIL HGT," and "49 FT" are emphasized so that the flight crew can quickly zero in on the key aspects of the NOTAM. In this regard, in some examples, the NOTAM visualization system 102 maintains a list of important terms that should be emphasized and emphasizes these terms when detected.

In some examples, the NOTAM description is revised into a more readable form. For instance, in some examples, the abbreviated terms are expanded into unabbreviated terms (e.g., "CLSD" to "CLOSED," "HGT" to "HEIGHT," etc.). In some examples, when there are multiple exceptions, the exceptions are separated on different lines.

Figure 7:
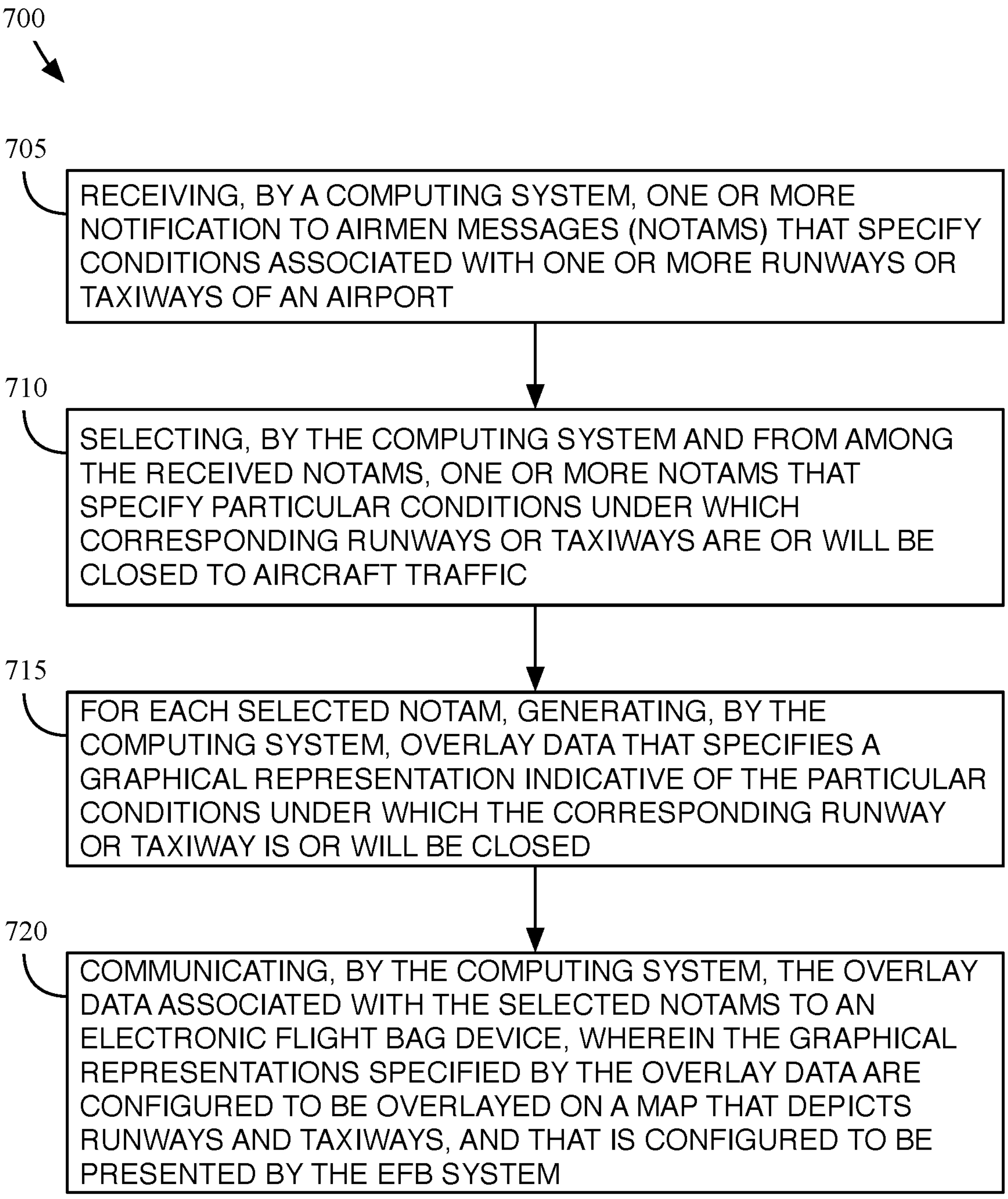
FIG. 7 illustrates operations performed by one or more devices described herein, in accordance with example embodiments.

FIG. 7 illustrates an example of operations 700 performed by some examples of the devices described herein. The operations at block 705 involve receiving, by a computing system, one or more notification to airmen messages (NOTAMs) 135 that specify conditions associated with one or more runways or taxiways of an airport.

The operations at block 710 involve selecting, by the computing system and from among the received NOTAMs 135, one or more NOTAMs 135 that specify particular conditions under which corresponding runways or taxiways are or will be closed to aircraft traffic.

The operations at block 715 involve, for each selected NOTAM 135, generating, by the computing system, overlay data 137 that specifies a graphical representation 500 indicative of the particular conditions under which the corresponding runway or taxiway is or will be closed.

The operations at block 720 involve communicating, by the computing system, the overlay data 137 associated with the selected NOTAMs to an EFB 112. The graphical representations 500 specified by the overlay data 137 are configured to be overlayed on a map that depicts runways and taxiways and that is configured to be presented by the EFB 112.

In some examples, selecting the one or more NOTAMs 135 that specify particular conditions involves selecting one or more NOTAMs 135 that specify a section of a runway or a taxiway that is or will be closed to aircraft traffic. In these examples, generating the overlay data 137 that specifies the graphical representation 500 indicative of the particular conditions involves generating overlay data 137 that specifies a graphical representation 500 that indicates the section 510 of the runway or the taxiway that is or will be closed to aircraft traffic.

In some examples, selecting the one or more NOTAMs 135 that specify particular conditions involves selecting one or more NOTAMs 135 that specify restrictions on types of use of a runway or taxiway or a portion thereof. In some of these examples, generating the overlay data 137 that specifies the graphical representation 500 indicative of the particular conditions involves generating overlay data 137 that specifies a graphical representation 500D that indicates the restrictions on the types of use of the runway or the taxiway, or the portion thereof.

In some examples, selecting the one or more NOTAMs 135 that specify particular conditions involves selecting one or more NOTAMs 135 that specify aircraft attribute limitations associated with a runway or taxiway or a portion thereof. In some of these examples, generating the overlay data 137 that specifies the graphical representation 500 indicative of the particular conditions involves generating overlay data 137 that specifies a graphical representation 500D that indicates the aircraft attribute limitations of the runway or the taxiway, or the portion thereof.

In some examples, generating overlay data 137 that specifies a graphical representation 500 indicative of the particular conditions involves generating a user-selectable indicator 515A that, when selected, causes a text representation 600 of the particular conditions to be presented.

Some examples further involve emphasizing portions of the text representation 600 that specify the particular conditions.

In some examples, NOTAMs 135 are added to a NOTAM database 215. In some of these examples, receiving the one or more NOTAMs 135 involves receiving one or more NOTAMs in response to determining that a NOTAM has been added to the NOTAM database 215.

In some examples, the NOTAM 135 corresponds to a textual notification. In some of these examples, selecting from among received NOTAMs 135 one or more NOTAMs 135 that specify particular conditions under which corresponding runways or taxiways are or will be closed to aircraft traffic involves searching the NOTAM 135 for text terms associated with closings of runways or taxiways.

Figure 8:
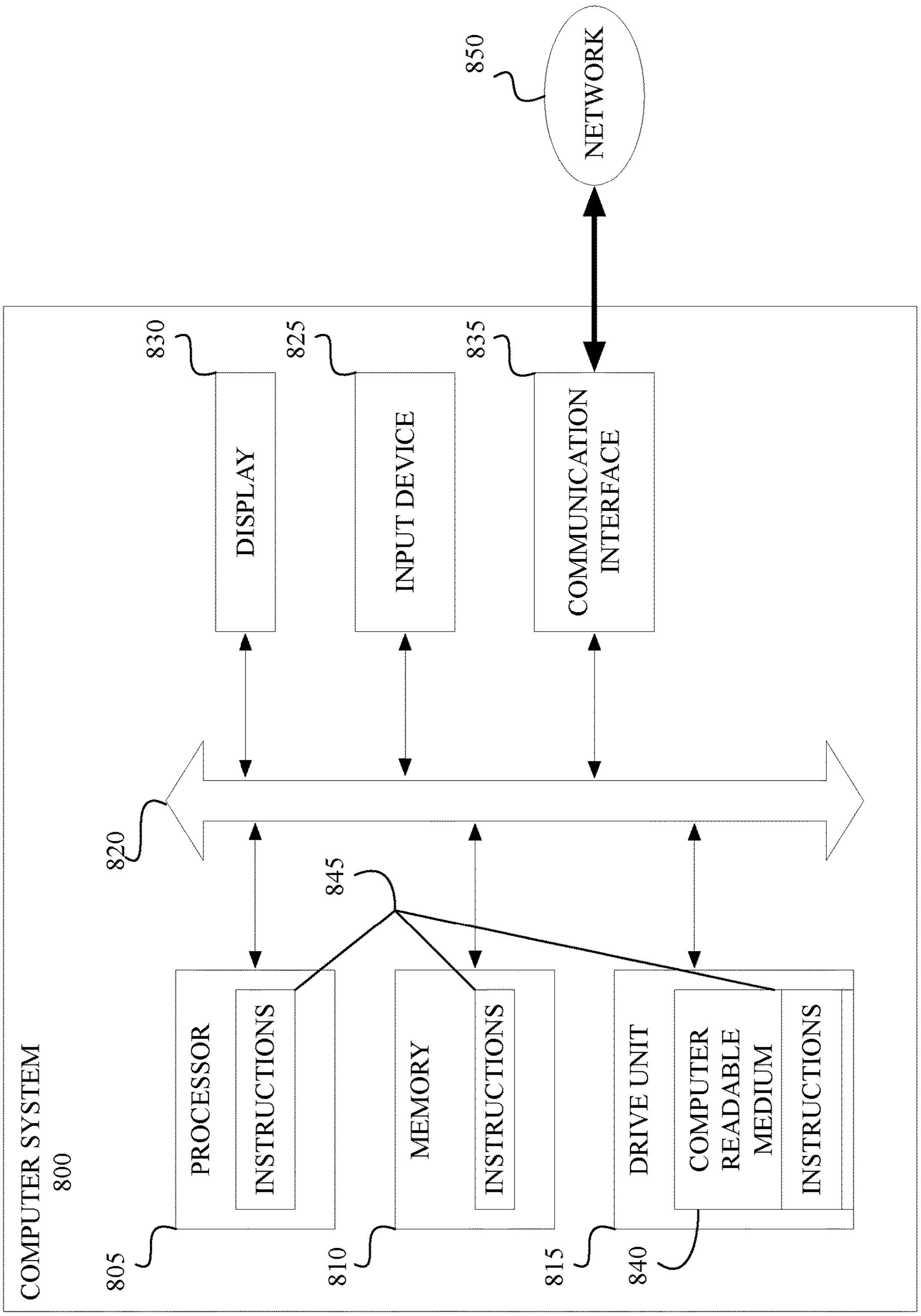
FIG. 8 illustrates a computer system, in accordance with example embodiments.

FIG. 8 illustrates an example of a computer system 800 that can form part of or implement any of the systems and/or devices described above. The computer system 800 can include a set of instructions 845 that the processor 805 can execute to cause the computer system 800 to perform any of the operations described above. An example of the computer system 800 can operate as a stand-alone device or can be connected, e.g., using a network, to other computer systems or peripheral devices.

In a networked example, the computer system 800 can operate in the capacity of a server or as a client computer in a server-client network environment, or as a peer computer system in a peer-to-peer (or distributed) environment. The computer system 800 can also be implemented as or incorporated into various devices, such as a personal computer or a mobile device, capable of executing instructions 845 (sequential or otherwise), causing a device to perform one or more actions. Further, each of the systems described can include a collection of subsystems that individually or jointly execute a set, or multiple sets, of instructions to perform one or more computer operations.

The computer system 800 can include one or more memory devices 810 communicatively coupled to a bus 820 for communicating information. In addition, code operable to cause the computer system to perform operations described above can be stored in the memory 810. The memory 810 can be random-access memory, read-only memory, programmable memory, hard disk drive, or any other type of memory or storage device.

The computer system 800 can include a display 830, such as a liquid crystal display (LCD), organic light-emitting diode (OLED) display, or any other display suitable for conveying information. The display 830 can act as an interface for the user to see processing results produced by processor 805.

Additionally, the computer system 800 can include an input device 825, such as a keyboard or mouse or touchscreen, configured to allow a user to interact with components of system 800.

The computer system 800 can also include drive unit 815 (e.g., flash storage). The drive unit 815 can include a computer-readable medium 840 in which the instructions 845 can be stored. The instructions 845 can reside completely, or at least partially, within the memory 810 and/or within the processor 805 during execution by the computer system 800. The memory 810 and the processor 805 also can include computer-readable media, as discussed above.

The computer system 800 can include a communication interface 835 to support communications via a network 850. The network 850 can include wired networks, wireless networks, or combinations thereof. The communication interface 835 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made, and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A computer-implemented method for communicating flight information to an electronic flight bag device (EFB), the method comprising:

querying a database, by a computing system, for one or more notification to airmen messages (NOTAMs) associated with one or more runways or taxiways of an airport;

selecting, by the computing system and from among the received NOTAMs, one or more NOTAMs that specify which corresponding runways or taxiways are or will be closed to aircraft traffic;

determining whether each selected NOTAM specifies an exception or particular conditions to the closing of the runway or the taxiway;

based on the selected NOTAM specifying particular conditions under which the corresponding runaway or taxiway is or will be closed, generating, by the computing system, overlay data that specifies a graphical representation indicative of the particular conditions under which the corresponding runway or taxiway is or will be closed;

based on the selected NOTAM not being associated with the exception or particular conditions, generating, by the computing system, overlay data that specifies a graphical representation indicative of a default closure for the runway or the taxiway; and communicating, by the computing system, the overlay data associated with the selected NOTAMs to the EFB, wherein the graphical representation specified by the overlay data is configured to be overlayed on a map that depicts runways and taxiways, and that is configured to be presented by the EFB, wherein the graphical representation specified by the overlay data is configured to be overlayed on the map and over corresponding sections of the runway or taxiway.

2. The computer-implemented method according to claim 1, wherein selecting the one or more NOTAMs comprises:

selecting one or more NOTAMs that specify a section of a runway or a taxiway that is or will be closed to aircraft traffic; and wherein generating the overlay data that specifies the graphical representation indicative of the particular conditions comprises:

generating overlay data that specifies the graphical representation that indicates the section of the runway or the taxiway that is or will be closed to aircraft traffic.

3. The computer-implemented method according to claim 1, wherein selecting the one or more NOTAMs comprises:

selecting one or more NOTAMs that specify restrictions on types of use of a runway or taxiway, or a portion thereof; and wherein generating the overlay data that specifies the graphical representation indicative of the particular conditions comprises:

generating overlay data that specifies the graphical representation that indicates the restrictions on the types of use of the runway or the taxiway, or the portion thereof.

4. The computer-implemented method according to claim 1, wherein selecting the one or more NOTAMs comprises:

selecting one or more NOTAMs that specify aircraft attribute limitations associated with a runway or taxiway, or a portion thereof; and wherein generating the overlay data that specifies the graphical representation indicative of the particular conditions comprises:

generating overlay data that specifies the graphical representation that indicates the aircraft attribute limitations of the runway or the taxiway, or the portion thereof.

5. The computer-implemented method according to claim 1, wherein generating overlay data that specifies the graphical representation indicative of the particular conditions comprises:

generating a user-selectable indicator that, when selected, causes a text representation of the particular conditions to be presented.

6. The computer-implemented method according to claim 5, further comprising:

emphasizing portions of the text representation that specify the particular conditions.

7. The computer-implemented method according to claim 1, wherein NOTAMs are added to the database, wherein receiving the one or more NOTAMs comprises:

receiving one or more NOTAMs in response to determining that a NOTAM has been added to the database.

8. The computer-implemented method according to claim 1, wherein the NOTAM corresponds to a textual notification, wherein selecting from among received NOTAMs one or more NOTAMs which corresponding runways or taxiways are or will be closed to aircraft traffic comprises:

searching the database for text terms associated with closings of runways or taxiways.

9. A computing device that facilitates for communicating information to an electronic flight bag device (EFB), the computing device comprises:

one or more processors; and a memory in communication with the one or more processors, wherein the memory stores instruction code that, when executed by the one or more processors, causes the computing device to perform operations comprising:

querying a database for one or more notification to airmen messages (NOTAMs) associated with one or more runways or taxiways of an airport;

selecting from among the received NOTAMs one or more NOTAMs that which corresponding runways or taxiways are or will be closed to aircraft traffic;

determining whether each selected NOTAM specifies an exception or particular conditions to the closing of the runway or the taxiway;

based on the selected NOTAM specifying particular conditions under which the corresponding runaway or taxiway is or will be closed, generating, by the computing system, overlay data that specifies a graphical representation indicative of the particular conditions under which the corresponding runway or taxiway is or will be closed;

based on the selected NOTAM not being associated with the exception or particular conditions, to generating overlay data that specifies a graphical representation indicative of a default closure for the runway or the taxiway; and communicating the overlay data associated with the selected NOTAMs to the EFB, wherein the graphical representation specified by the overlay data is configured to be overlayed on a map that depicts runways and taxiways, and that is configured to be presented by the EFB, wherein the graphical representation specified by the overlay data is configured to be overlayed on the map and over corresponding sections of the runway or taxiway.

10. The computing device according to claim 9, wherein the operations that involve selecting the one or more NOTAMs comprise:

selecting one or more NOTAMs that specify a section of a runway or a taxiway that is or will be closed to aircraft traffic; and wherein generating the overlay data that specifies the graphical representation indicative of the particular conditions comprises:

generating overlay data that specifies the graphical representation that indicates the section of the runway or the taxiway that is or will be closed to aircraft traffic.

11. The computing device according to claim 9, wherein the operations that involve selecting the one or more NOTAMs comprise:

selecting one or more NOTAMs that specify restrictions on types of use of a runway or taxiway, or a portion thereof; and wherein generating the overlay data that specifies the graphical representation indicative of the particular conditions comprises:

generating overlay data that specifies the graphical representation that indicates the restrictions on the types of use of the runway or the taxiway, or the portion thereof.

12. The computing device according to claim 9, wherein the operations that involve selecting the one or more NOTAMs comprise:

selecting one or more NOTAMs that specify aircraft attribute limitations associated with a runway or taxiway, or a portion thereof; and wherein generating the overlay data that specifies the graphical representation indicative of the particular conditions comprises:

generating overlay data that specifies the graphical representation that indicates the aircraft attribute limitations of the runway or the taxiway, or the portion thereof.

13. The computing device according to claim 9, wherein the operations that involve generating overlay data that specifies the graphical representation indicative of the particular conditions comprises:

generating a user-selectable indicator that, when selected, causes a text representation of the particular conditions to be presented.

14. The computing device according to claim 13, wherein the operations further comprise:

emphasizing portions of the text representation that specify the particular conditions.

15. The computing device according to claim 9, wherein NOTAMs are added to the database, wherein the operations that involve receiving the one or more NOTAMs comprise:

receiving one or more NOTAMs in response to determining that a NOTAM has been added to the database.

16. The computing device according to claim 9, wherein the NOTAM corresponds to a textual notification, wherein the operations that involve selecting from among received NOTAMs one or more NOTAMs which corresponding runways or taxiways are or will be closed to aircraft traffic comprise:

searching the database for text terms associated with closings of runways or taxiways.

17. A non-transitory computer-readable medium having stored thereon instruction code for communicating information to an electronic flight bag device (EFB), wherein when executed by one or more processors of a computing device, the instruction code causes the computing device to perform operations comprising:

querying a database for one or more notification to airmen messages (NOTAMs) associated with one or more runways or taxiways of an airport;

selecting from among the received NOTAMs one or more NOTAMs that specify which corresponding runways or taxiways are or will be closed to aircraft traffic;

determining whether each selected NOTAM specifies an exception or particular conditions to the closing of the runway or the taxiway;

based on the selected NOTAM specifying particular conditions under which the corresponding runaway or taxiway is or will be closed, generating, by the computing system, overlay data that specifies a graphical representation indicative of the particular conditions under which the corresponding runway or taxiway is or will be closed;

based on the selected NOTAM not being associated with the exception or particular conditions, generating overlay data that specifies a graphical representation indicative of a default closure for the runway or the taxiway; and communicating the overlay data associated with the selected NOTAMs to the EFB of the aircraft, wherein the graphical representation specified by the overlay data is configured to be overlayed on a map that depicts runways and taxiways and that is configured to be presented by the EFB, wherein the graphical representation specified by the overlay data is configured to be overlayed on the map and over corresponding sections of the runway or taxiway.

18. The non-transitory computer-readable medium according to claim 17, wherein the operations that involve selecting the one or more NOTAMs comprise:

selecting one or more NOTAMs that specify a section of a runway or a taxiway that is or will be closed to aircraft traffic; and wherein generating the overlay data that specifies the graphical representation indicative of the particular conditions comprises: generating overlay data that specifies the graphical representation that indicates the section of the runway or the taxiway that is or will be closed to aircraft traffic.

19. The non-transitory computer-readable medium according to claim 17, wherein the operations that involve selecting the one or more NOTAMs comprise:

selecting one or more NOTAMs that specify restrictions on types of use of a runway or taxiway, or a portion thereof; and wherein generating the overlay data that specifies the graphical representation indicative of the particular conditions comprises: generating overlay data that specifies the graphical representation that indicates the restrictions on the types of use of the runway or the taxiway, or the portion thereof.

20. The non-transitory computer-readable medium according to claim 17, wherein the operations that involve selecting the one or more NOTAMs comprise:

selecting one or more NOTAMs that specify aircraft attribute limitations associated with a runway or taxiway, or a portion thereof; and wherein generating the overlay data that specifies the graphical representation indicative of the particular conditions comprises: generating overlay data that specifies the graphical representation that indicates the aircraft attribute limitations of the runway or the taxiway, or the portion thereof.

21. The computer-implemented method according to claim 1, further comprising:

upon receiving a selection of the graphical representation, providing for display a dialog box to be presented by the EFB that includes text of a corresponding NOTAM.

* * * * *